United States Patent
McCallister et al.

(10) Patent No.: US 8,824,574 B2
(45) Date of Patent: Sep. 2, 2014

(54) TRANSMITTING UNIT THAT REDUCES PAPR AND METHOD THEREFOR

(75) Inventors: Ronald Duane McCallister, Scottsdale, AZ (US); Eric M. Brombaugh, Mesa, AZ (US)

(73) Assignee: CrestCom, Inc., Scottsdale, AZ (US)

( * ) Notice: Subject to any disclaimer, the term of this patent is extended or adjusted under 35 U.S.C. 154(b) by 1364 days.

(21) Appl. No.: 12/557,915

(22) Filed: Sep. 11, 2009

(65) Prior Publication Data

US 2011/0064162 A1    Mar. 17, 2011

(51) Int. Cl.
*H04K 1/10*   (2006.01)
*H04K 1/02*   (2006.01)
*H04L 27/26*   (2006.01)
*H04L 27/36*   (2006.01)
*H04L 5/00*   (2006.01)

(52) U.S. Cl.
CPC .......... *H04L 27/2623* (2013.01); *H04L 5/0048* (2013.01); *H04L 27/367* (2013.01)
USPC .......................................... 375/260; 375/296

(58) Field of Classification Search
USPC ................. 375/296, 295; 455/144.2
See application file for complete search history.

(56) References Cited

U.S. PATENT DOCUMENTS

| | | | |
|---|---|---|---|
| 4,298,871 A | 11/1981 | Kennedy et al. | |
| 5,519,530 A | 5/1996 | Utsumi | |
| 5,646,631 A | 7/1997 | Arntz | |
| 6,236,864 B1 | 5/2001 | McGowan et al. | |
| 6,332,119 B1 * | 12/2001 | Hinderks | 704/206 |
| 6,356,606 B1 | 3/2002 | Hahm | |
| 6,366,619 B1 | 4/2002 | McCallister et al. | |
| 6,519,244 B1 | 2/2003 | Unno | |
| 6,741,661 B2 | 5/2004 | Wheatley, III et al. | |
| 6,845,082 B2 | 1/2005 | Bourget et al. | |
| 6,928,121 B2 | 8/2005 | MacFarlane Shearer, III et al. | |
| 6,999,522 B2 | 2/2006 | Shearer, III | |
| 6,999,733 B2 | 2/2006 | Hori et al. | |

(Continued)

FOREIGN PATENT DOCUMENTS

| | | | |
|---|---|---|---|
| EP | 0633658 | * | 1/1995 |
| EP | 0633658 A2 | | 1/1995 |

OTHER PUBLICATIONS

International Search Report and Written Opinion regarding PCT/US2010/046294, dated Oct. 19, 2010.

(Continued)

*Primary Examiner* — Chieh M Fan
*Assistant Examiner* — Brian J Stevens
(74) *Attorney, Agent, or Firm* — Schmeiser, Olsen & Watts LLP; Lowell W. Gresham

(57) ABSTRACT

A communication system includes a transmitting unit with a peak to average power (PAPR) reduction section. The PAPR reduction section modifies the PAPR reduction it effects in a communication signal in accordance with two different error vector magnitude (EVM) constraints for each channel type, where a channel type is a distinct combination of a modulation order and a coding rate. The EVM constraint followed for each subcarrier in an OFDM or OFDMA application is selected in response to whether the subcarrier conveys voice or non-voice data. The PAPR reduction section may include a scaling filter. The scaling filter is efficiently defined through the use of a predetermined sinc function and a first stage scale factor that is calculated in response to a weighted average of excursion signal subcarrier gains, where the weighting follows the distribution of channel types through the subcarriers.

15 Claims, 8 Drawing Sheets

(56) References Cited

U.S. PATENT DOCUMENTS

| | | |
|---|---|---|
| 7,110,445 B2 | 9/2006 | Melsa |
| 7,236,533 B2 | 6/2007 | Chu et al. |
| 7,295,816 B2 | 11/2007 | McCallister |
| 7,376,197 B2 | 5/2008 | Berangi et al. |
| 8,026,845 B2 * | 9/2011 | Wolf ........................ 342/357.29 |
| 2002/0191705 A1 | 12/2002 | Melsa et al. |
| 2003/0053562 A1 | 3/2003 | Busson et al. |
| 2003/0086507 A1 | 5/2003 | Kim et al. |
| 2005/0163252 A1 | 7/2005 | McCallister et al. |
| 2007/0254592 A1 * | 11/2007 | McCallister et al. ...... 455/67.11 |
| 2010/0054621 A1 * | 3/2010 | Qi et al. ........................ 382/260 |

OTHER PUBLICATIONS

Wang, Luqing & Tellambura, Chintha, "A Simplified Clipping and Filtering Technique for PAR Reduction in OFDM Systems", Jun. 6, 2005, , IEEE Signal Processing Letters, vol. 12, No. 6.

* cited by examiner

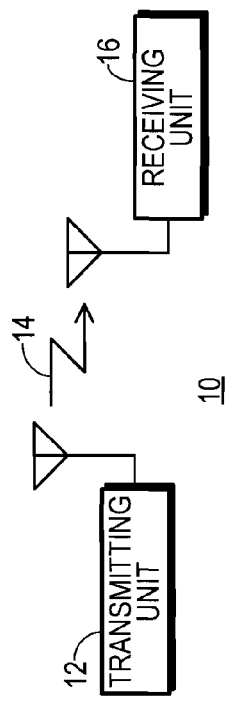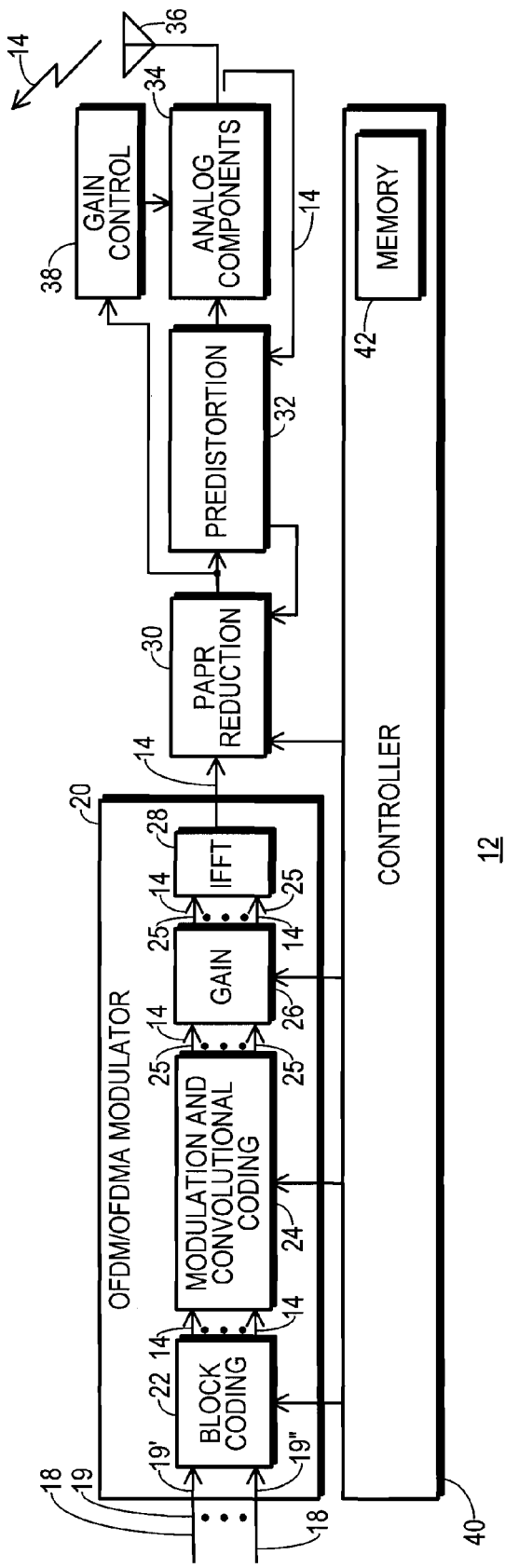

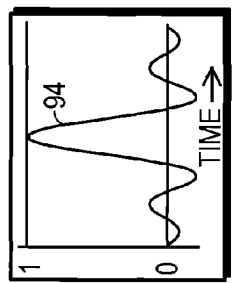
*FIG. 9*
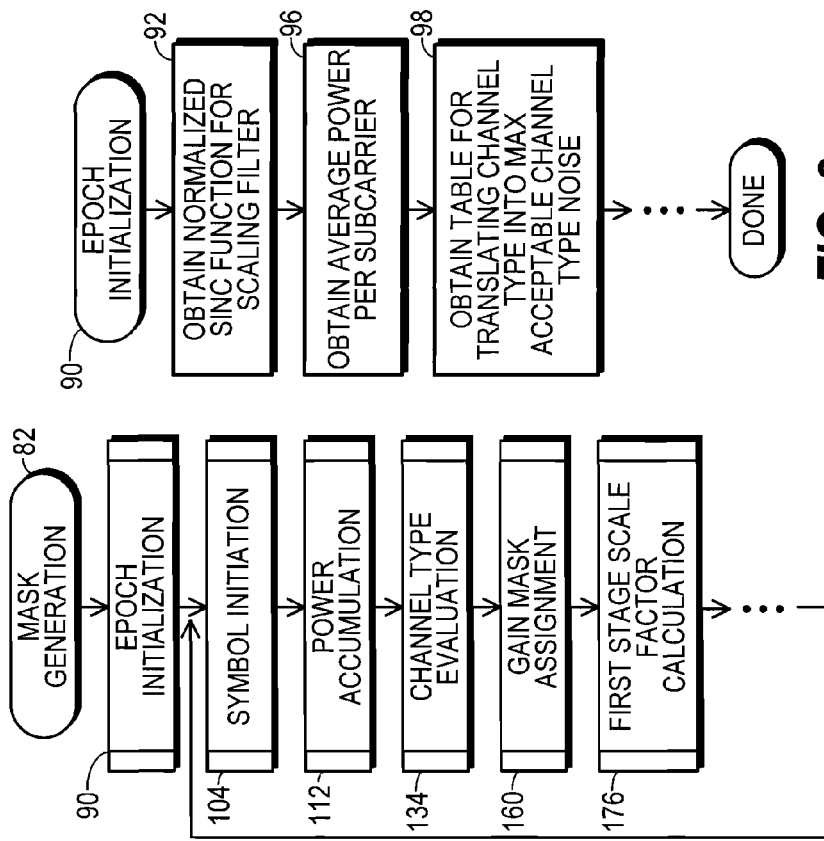
*FIG. 10*
*FIG. 8*
*FIG. 7*

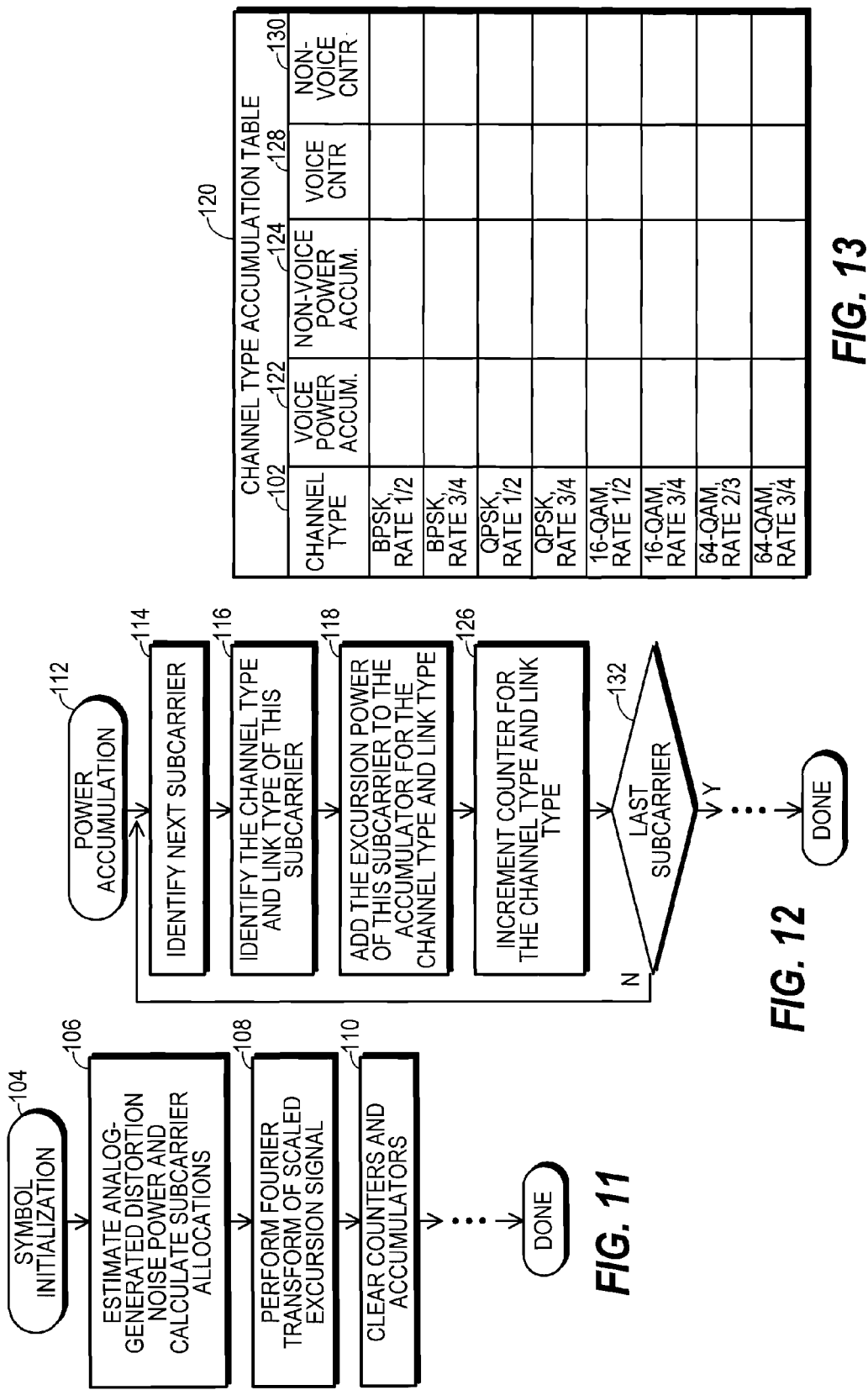

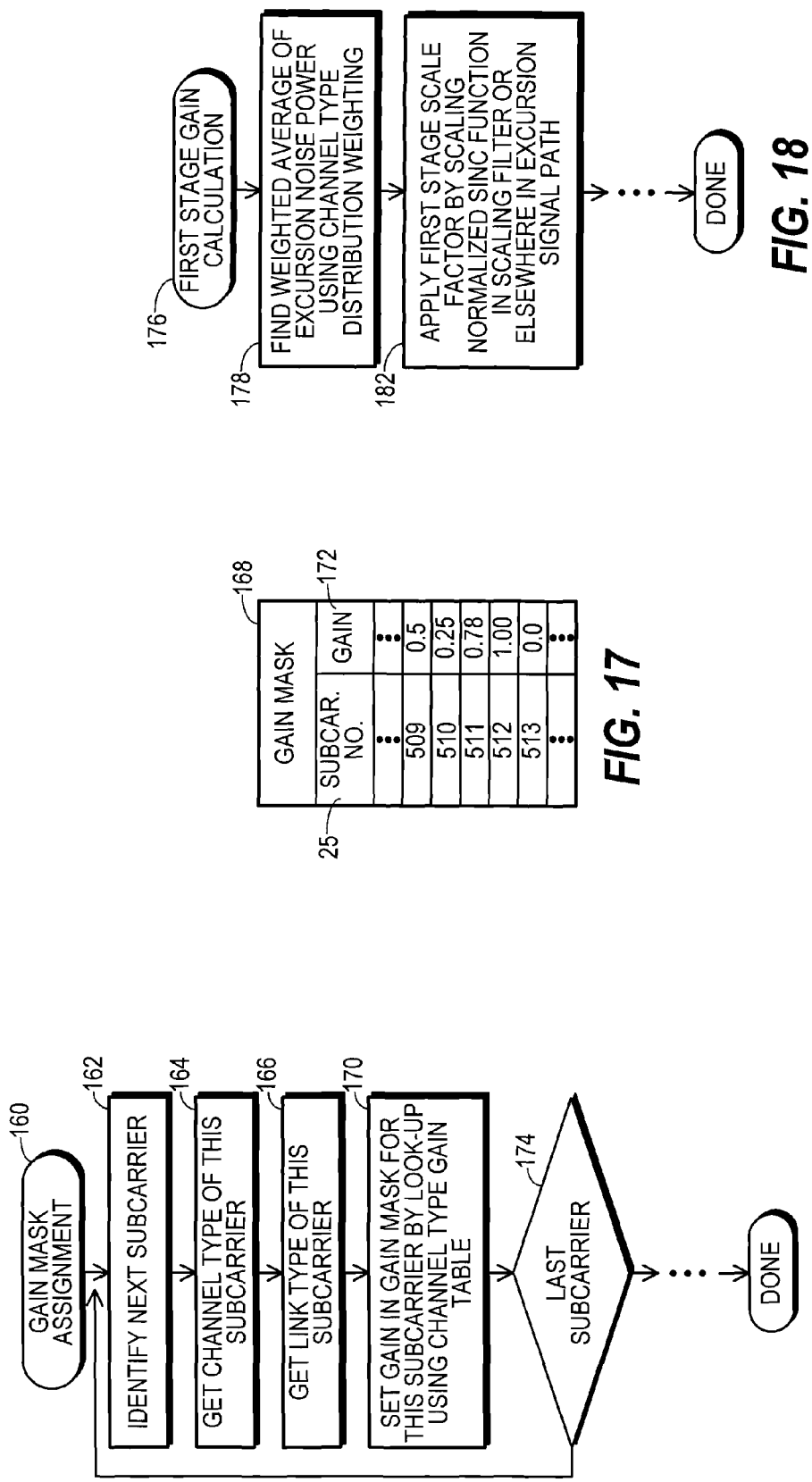

TRANSMITTING UNIT THAT REDUCES PAPR AND METHOD THEREFOR

TECHNICAL FIELD OF THE INVENTION

The present invention relates generally to the field of communication systems. Specifically, the present invention relates to transmitting units which include circuits and/or processes for the purpose of reducing peak to average power ratio (PAPR). More specifically, the present invention relates to reducing PAPR in an effective and power-efficient manner.

BACKGROUND OF THE INVENTION

A peak of a communication signal represents the greatest instantaneous amplitude, magnitude, or power level exhibited by the communication signal within some period of time. The average of a communication signal represents the average amplitude, magnitude, or power level of the communication signal over that same period. The peak is greater than the average, and the ratio of the peak power to the average power (PAPR) is a parameter of interest to communication system designers.

As PAPR increases, meeting a transmitting unit's design goals becomes increasingly difficult. A transmitting unit's power amplifier is desirably as linear as possible when used to amplify communication signals modulated in accordance with many modern modulation formats. But linearity is achieved only so long as the amplitude of a communication signal remains beneath some maximum level. If the communication signal's instantaneous power exceeds this maximum level, non-linear amplification results, causing the spectrum of the communication signal to grow and exceed regulatory limitations imposed on the transmitting unit. Accordingly, the communication signal's instantaneous power should be kept below this maximum level.

Transmitting units typically operate under economic constraints which prevent the maximum instantaneous power level for linear operation to be at a high level. Significant costs are typically involved in providing power amplifiers and power amplifier biasing systems which support linear operation up to the high level.

If the average power level of the communication signal is far beneath a modest and economically practical maximum level, one or more of several undesirable consequences result. The power amplifier may operate inefficiently and consume more power than desired for the communication performance achieved. The distance over which the communication signal may be successfully received may become diminished. Or, a less efficient modulation may be used in order to effect communications, resulting in slower data rates for longer durations in order to transmit a given amount of data. Transmitting a given amount of data over a longer duration increases power consumption. Since many transmitting units are battery operated, the consumption of excessive power is a particularly undesirable design feature because excessive power consumption leads to the use of undesirably large batteries and/or frequent battery recharging.

The communication signals amplified by the transmitting units' power amplifiers and compatible with many modern communication standards tend to exhibit high PAPR levels. This problem is particularly acute in connection with communication signals modulated in accordance with modern communication standards configured to implement OFDM and OFDMA formats. Accordingly, modern transmitting units tend to take steps to reduce the PAPR of the communication signal prior to amplification in a power amplifier.

A variety of techniques for PAPR reduction have been developed. When a communication signal's peak is maintained near the maximum level for linear operation of the power amplifier and when PAPR has been reduced, the average power level may then be increased, causing improved communication performance. But to be effective at PAPR reduction, the techniques used to reduce PAPR should avoid spectral regrowth to remain within regulatory limitations and introduce as little noise into the communication signal as possible. The introduction of noise through PAPR reduction reduces communication performance improvements achieved through operating at a higher average power level. If too much noise is introduced, any communication performance improvement will be entirely counteracted. One particularly effective technique is taught in "Method and Apparatus for Adaptively Controlling Signals," U.S. Publication No. 2007/0254592, filed 27 Apr. 2006, invented by the inventors of the present invention, and incorporated by reference, in its entirety, herein.

But it is also desirable that PAPR reduction be performed in a way that consumes as little power as possible. The efficient use of power is almost always a desirable goal, and since many modern transmission units are battery operated this desirable goal takes on added importance. Moreover, in some applications the efficient use of power may be of such importance that even highly effective PAPR reduction techniques are not practical unless they are also particularly efficient at consuming power. Accordingly, a need exists for a transmitting unit that reduces PAPR in a particularly effective manner and in a manner that consumes as little power as possible.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a block diagram of a communication system within which a transmitting unit configured in accordance with the teaching of the present invention operates;

FIG. 2 shows a block diagram of an exemplary transmitting unit configured in accordance with the teaching of the present invention;

FIG. 7 shows a flow chart of an exemplary mask generation process implemented to effect PAPR reduction by the transmitting unit of FIG. 2;

FIG. 8 shows a flow chart of an exemplary epoch initialization subprocess of the mask generation process of FIG. 7;

FIG. 9 graphically shows an exemplary data structure which defines a scaling filter and is maintained in a memory portion of the transmitting unit of FIG. 2;

FIG. 10 shows an exemplary epoch channel type table which may be generated by the epoch initialization subprocess of FIG. 8;

FIG. 11 shows a flow chart of an exemplary symbol initialization subprocess of the mask generation process of FIG. 7;

FIG. 12 shows a flow chart of an exemplary power accumulation subprocess of the mask generation process of FIG. 7;

FIG. 13 shows an exemplary channel type accumulation table which may be generated by the power accumulation subprocess of FIG. 12;

FIG. 16 shows a flow chart of an exemplary gain mask assignment subprocess of the mask generation process of FIG. 7;

FIG. 17 shows an exemplary gain mask which may be generated by the gain mask assignment subprocess of FIG. 16;

FIG. 18 shows a flow chart of an exemplary first stage scale factor calculation subprocess of the mask generation process of FIG. 7;

DETAILED DESCRIPTION OF THE PREFERRED EMBODIMENTS

Figure 4:
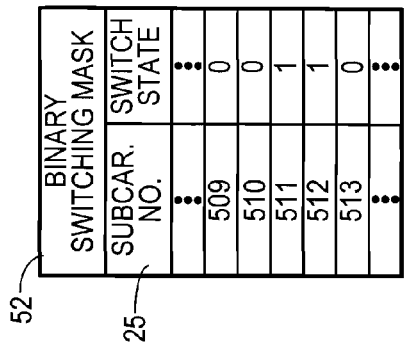
FIG. 4 shows a block diagram of an exemplary binary gain mask used in the PAPR reduction section of FIG. 3.

FIG. 1 shows a block diagram of a communication system 10 within which a transmitting unit 12 configured in accordance with the teaching of the present invention operates. Transmitting unit 12 broadcasts a communication signal 14 that is successfully received and demodulated by a receiving unit 16. The device that implements transmitting unit 12 may also implement a receiving unit 16, and vice-versa. Within communication system 10, a single transmitting unit 12 may concurrently transmit communication signal 14 to a plurality of receiving units 16, as occurs when a base station transmits over a downlink to a number of subscriber units within its radio range. In accordance with commonly implemented communications standards, such as WiFi (IEEE 802.11) and WiMAX (IEEE 802.16), this downlink may follow an orthogonal frequency division multiplex (OFDM) format. Likewise, a plurality of transmitting units 12 may concurrently transmit to a single receiving unit 16, as occurs when a number of subscriber units transmit over an uplink to a base station. In accordance with the WiFi and WiMAX communication standards, this uplink may follow an orthogonal frequency division multiple access (OFDMA) format. Those skilled in the art will appreciate that the present invention is not limited to operating in accordance with any single communication standard as now configured or as such communication standards may change in the future. But those skilled in the art will also appreciate that the OFDM and OFDMA formats produce challenging peak to average power ratio (PAPR) scenarios for transmitting unit 12.

FIG. 2 shows a block diagram of an exemplary transmitting unit 12. Transmitting unit 12 receives a plurality of raw data streams 18 at an input of a modulator 20. Modulator 20 is configured to implement either an OFDM or OFDMA modulation format in a preferred embodiment of the present invention. But other embodiments may implement other modulation formats. As indicated throughout the figures, the use of ellipsis in FIG. 2 in connection with data streams 18 indicates that any number of data streams may be provided. For a subscriber unit application that transmits over an OFDMA uplink, only a single data stream 18 may be provided. For a base station application that transmits over an OFDM downlink, a fairly large number of independent data streams 18 may be provided. Generally, each data stream 18 corresponds to a single communication link 19 between transmitting unit 12 and a particular receiving unit 16. Since receiving units 16 may be located at different distances from transmitting unit 12 and may experience different obstacles between transmitting unit 12 and the receiving units 16, each link 19 is desirably configured independently from the others, even though communication signal 14 may convey a number of different communication links 19.

Data streams 18 for links 19 are received within modulator 20 at a block coding section 22. In one embodiment, block coding section 22 encodes each data stream 18 using one of at least two different forms of block coding. Different data streams 18 may receive different forms of block coding. And, the same data stream 18 may receive different forms of block coding at different times. Block coding section 22 may also perform interleaving to improve the effectiveness of the block coding.

The at least two different forms of block coding implemented by block coding section 22 are characterized by two different latencies. In other words, one of the block encoding schemes implements a block code of a longer duration while the other block encoding scheme implements a block code of a shorter duration. The duration of the code may refer either to the code length itself or to the number of iterations for which a block of data is encoded in a reiterative fashion. The precise characteristics of the block encoding schemes are not relevant so long as the schemes are effective at error detection and correction. In accordance with conventional block encoding schemes, the longer duration block code implements stronger error detection and correction and achieves a larger coding gain for its communication link 19, when compared to the shorter duration block code. But the longer duration block code inserts greater latency, which refers to the processing time which transpires between the instant when an item of raw data arrives at block coding section 22 and when the same item of data is decoded from a corresponding block decoding section (not shown) in a receiving unit 16 (FIG. 1).

As will be described in more detail below, the use of a longer duration block code in combination with a smaller duration block code achieves a power consumption improvement. This improvement results because current communication standards typically specify noise limits in the form of error vector magnitude (EVM) specifications with which transmitting units 12 should comply to be compatible with the specification. These EVM specifications are based upon achieving a single desired signal to noise (SNR) ratio at a receiving unit 16 for a given modulation order and convolutional encoding rate. But the single desired SNR is achieved assuming the use of only a single block encoding scheme that is appropriate for voice data. In other words, the specifications assume the use of a single block encoding scheme with sufficiently low latency to accommodate a voice conversation. Such encoding schemes use shorter duration block codes, typically achieve relatively weak error detection and correction performance, and provide less link coding gain than longer duration block codes. On the other hand, the longer duration block codes typically introduce an amount of delay that is unacceptable for voice communications.

In accordance with one embodiment of the present invention, data streams 18 which convey voice data are encoded with a shorter duration block code while data streams 18 which convey non-voice data may be encoded with a longer duration block code. More particularly, data streams 18 which convey non-voice data are desirably encoded with a longer duration block code when the receiving units 16 for which they are intended have the ability to demodulate and decode the longer duration block code. The use of the longer duration block code allows a greater amount of PAPR reduction in transmitting unit 12, which in turn allows the average power of communication signal 14 to increase, thereby increasing SNR at the receiving units 16, increasing the likelihood that higher data rate modulation formats may be used with data streams 18, and increasing the likelihood that a given amount of data may be transmitted in less time. Thus, controlling the manner in which PAPR reduction is applied in response to the transmission of voice or non-voice data achieves power savings because a given amount of data is transmitted in less time. And, as the proportion of all data traffic shifts toward a greater proportion of non-voice data traffic, the amount of power savings becomes more significant.

Block coding section 22 generates communication signal 14 in a weakly processed digital form. Communication signal 14 receives much more processing within transmitting unit 12 before being broadcast from transmitting unit 12, as is detailed below. This weakly processed form of communication signal 14 passes to a modulation and convolutional coding section 24. Section 24 processes communication signal 14 in accordance with a plurality of different channel types, where each channel type corresponds to a distinct modulation order and convolutional coding rate. Typically, each data stream 18 is assigned a channel type appropriate for that data stream 18, in accordance with the SNR of the communication link 19 with the data stream's intended receiving unit 16. Exemplary channel types may include: 1) BPSK at coding rate ½, 2) BPSK at coding rate ¾, 3) QPSK at coding rate ½, 4) QPSK at coding rate ¾, 5) 16-QAM at coding rate ½, 6) 16-QAM at coding rate ¾, 7) 64-QAM at coding rate ⅔, and 8) 64-QAM at coding rate ¾. But the use of this particular list is not a requirement of the present invention. In an embodiment of modulator 20 that implements a Long Term Evolution (LTE) form of OFDM or OFDMA, section 24 may perform a discrete Fourier transform, and typically a fast Fourier transform, of the modulated and convolutionally encoded data. And, subcarrier mapping also occurs within section 24. Subcarrier mapping is the process in which the modulated and convolutionally encoded data are assigned to specific subcarriers 25 in accordance with OFDM or OFDMA communication formats. The subcarrier assignments may change on a symbol-period by symbol-period basis.

Communication signal 14 leaves section 24 with the data that communication signal 14 conveys modulated, encoded, and partitioned for a plurality of individual subcarriers 25. Several hundred subcarriers 25 may be present, but that is not a requirement of the present invention. In one embodiment, communication signal 14 passes from section 24 to a gain section 26. Gain section 26 permits an opportunity to individually adjust the gains of the different subcarriers 25. For example, subcarriers 25 designated as pilot subcarriers 25 may have their gain boosted relative to data subcarriers 25. Or in another embodiment, all subcarriers 25 may be given the same gain. Or in yet another embodiment, different data subcarriers 25 may be given different gains.

Communication signal 14 passes from gain section 26 to an inverse fast Fourier transform (IFFT) section 28. IFFT section 28 repetitively performs inverse Fourier transforms on blocks of data for individual symbol periods of communication signal 14. IFFT section 28 also performs a parallel-to-serial conversion, converting communication signal 14 from a frequency domain signal into a time domain signal. Communication signal 14 exits modulator 20 from IFFT section 28.

The time domain version of communication signal 14 provided by modulator 20 passes to a PAPR reduction section 30. PAPR reduction section 30 reduces the peak to average power ratio of communication signal 14 in such a way as to minimize spectral regrowth and to add as little noise into communication signal 14 as possible. Moreover, PAPR reduction section 30 desirably achieves as much PAPR reduction as possible within constraints imposed by a given set of noise limits. PAPR reduction section 30 is discussed in more detail below.

Although not shown in FIG. 2, a cyclic prefix and pulse shaping may be added following PAPR reduction section 30.

After processing in PAPR reduction section 30, communication signal 14 eventually passes to a predistortion section 32. In one embodiment, predistortion section 32 extends the range of linearity for a power amplifier portion of transmitting unit 12 by distorting communication signal 14 in just the right way so that after experiencing distortion in the power amplifier, the resulting amplified version of communication signal 14 appears to have undergone a linear amplification.

When the predistorted version of communication signal 14 emerges from predistortion section 32, it passes to analog components 34. Analog components 34 may include digital-to-analog converters, a local oscillator, one or more analog mixers, a band-pass filter, and the power amplifier, along with attendant preamplifiers, feed networks, and biasing systems. Analog components 34, convert communication signal 14 from a baseband digital signal into an analog radio-frequency (RF) signal. This analog RF form of communication signal 14 passes to an antenna 36. Communication signal 14 is broadcast from transmitting unit 12 at antenna 36.

Analog components 34, and primarily the power amplifier portion of analog components 34, introduce analog-generated distortion noise power into communication signal 14. A small portion of the analog RF form of communication signal 14 is fed back upstream to predistortion section 32 for comparison, after appropriate processing, with the downstream-propagating form of communication signal 14 received at predistortion section 32. As a result of this comparison, predistortion section 32 makes adjustments in the distortion it introduces into communication signal 14 to make the incoming upstream-propagating form of communication signal 14 better match the incoming downstream-propagating form of communication signal 14. Any analog-generated distortion noise power which cannot be removed provides an estimate of the analog-generated distortion noise power introduced into communication signal 14 by analog components 34, and this estimate is passed upstream to PAPR reduction section 30 for use in determining how much noise PAPR reduction section 30 may introduce into communication signal 14 to reduce the PAPR of communication signal 14.

A gain control section 38 has an output which controls analog components 34 in a manner which implements a gain parameter for communication signal 14. In one embodiment, gain control section 38 adjusts biasing for the power amplifier portion of analog components 34 so that the peaks of communication signal 14 remain just barely beneath the maximum signal limit for linear amplification within the power amplifier. So long as the peaks of communication signal 14 remain below this maximum limit, substantially linear amplification takes place. Gain or attenuation is provided by gain control section 38 to maintain the peaks at this maximum limit. An input for gain control section 38 may be obtained from any of a variety of downstream-propagating versions of communication signal 14, such as the form of communication signal 14 provided by PAPR reduction section 30.

Transmitting unit 12 also includes a controller 40. Controller 40 may be viewed as a central processing unit, processor, microcontroller, microprocessor, digital signal processor, or the like. Controller 40 is desirably configured through the provision of software to cause transmitting unit 12 to successfully process and broadcast communication signal 14 so that it meets regulatory limitations and can be successfully demodulated and decoded by receiving units 16 (FIG. 1). Controller 40 includes a memory 42 in which is stored the software and data useful in controlling the operation of transmitting unit 12. Controller 40 couples to block coding section 22 to specify whether to implement block encoding for the different links 19 in accordance with a longer duration block code or a shorter duration block code. Controller 40 couples to modulation and convolutional coding section 24 to specify which channel type and which subcarriers 25 to use with which data streams 18. Controller 40 couples to gain section 26 to specify which gain to apply to which subcarriers 25. Controller 40 couples to PAPR reduction section 30 to specify various gain masks, thresholds, scaling filters and scale factors, as discussed in more detail below. And, controller 40 may couple to and control other portions of transmitting unit 12 not specifically detailed in FIG. 2.

Figure 3:
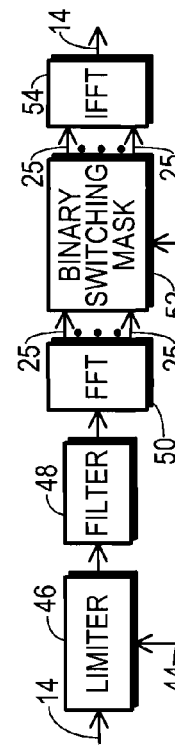
FIG. 3 shows a block diagram of a first embodiment of a peak to average power ratio (PAPR) reduction section of the exemplary transmitting unit of FIG. 2.

FIG. 3 shows a block diagram of a first embodiment of PAPR reduction section 30. In accordance with this embodiment, the version of communication signal 14 provided by modulator 20 is applied to a limiter 46 which passes all samples exhibiting a magnitude below a threshold 44 without altering the samples, and substitutes the threshold 44 magnitude for any samples exhibiting a magnitude greater than or equal to threshold 44. Threshold 44 is specified by controller 40 (FIG. 2). This limiting operation clips all peaks in communication signal 14 that exceed threshold 44, but also introduces spectral regrowth outside the allocated frequency band for communication signal 14 while adding noise power throughout the allocated frequency band. Although not specifically shown, the sampling rate of communication signal 14 may be increased prior to limiter 46 to accommodate the spectral regrowth. Controller 40 may increase threshold 44 to decrease the amount of PAPR reduction achieved and to decrease the amount of noise power added to communication signal 14. Or, controller 40 may decrease threshold 44 to increase the amount of PAPR reduction achieved but at the expense of increasing the amount of noise power added to communication signal 14.

Communication signal 14 passes from limiter 46 to a low-pass filter 48 which blocks the noise outside of the allocated frequency band for communication signal 14 to remove the spectral regrowth. In one embodiment (not shown) additional iterations of limiter 46 and filter 48 may be cascaded together to improve the effectiveness of peak reduction. For an OFDM implementation of transmitting unit 12 (FIGS. 1-2), the form of communication signal 14 that emerges from filter 48 may serve as the output of PAPR section 30. But for an OFDMA implementation, the communication signal 14 from filter 48 is desirably applied to an in-band switch. The in-band switch processes communication signal 14 through a Fourier transform (FFT) section 50, a binary switching mask 52, and an inverse Fourier transform (IFFT) section 54. FFT section 50 transforms the time domain version of communication signal 14 into a frequency domain version, with separate frequency bins for each subcarrier 25.

FIG. 4 shows a block diagram of an exemplary binary switching mask 52. Referring to FIGS. 3-4, binary switching mask 52 implements a dot product multiplication in each subcarrier 25 with either the value of one or zero. Controller 40 defines binary switching mask 52 to include ones for those subcarriers 25 that are allocated to transmitting unit 12, and zeros for all other subcarriers 25. As the assignment of subcarriers 25 to transmitting unit 12 changes from symbol-period to symbol-period, the definition of binary switching mask 52 also changes. As a result of the dot product multiplication at binary switching mask 52, power is passed only in those subcarriers 25 of the allocated frequency band specifically assigned to transmitting unit 12. This power includes the power from communication signal 14 received at the input to limiter 46 along with in-band noise power added by the operation of limiter 46. No power is passed in subcarriers 25 of the allocated frequency band not assigned to transmitting unit 12. Accordingly, transmitting unit 12 introduces no noise into subcarriers 25 where other transmitting units 12 may be transmitting.

Following the switching operation of binary switching mask 52, communication signal 14 is transformed back into a time domain signal through IFFT section 54. The form of communication signal 14 that emerges from IFFT section 54 may serve as the output of PAPR section 30.

Figure 5:
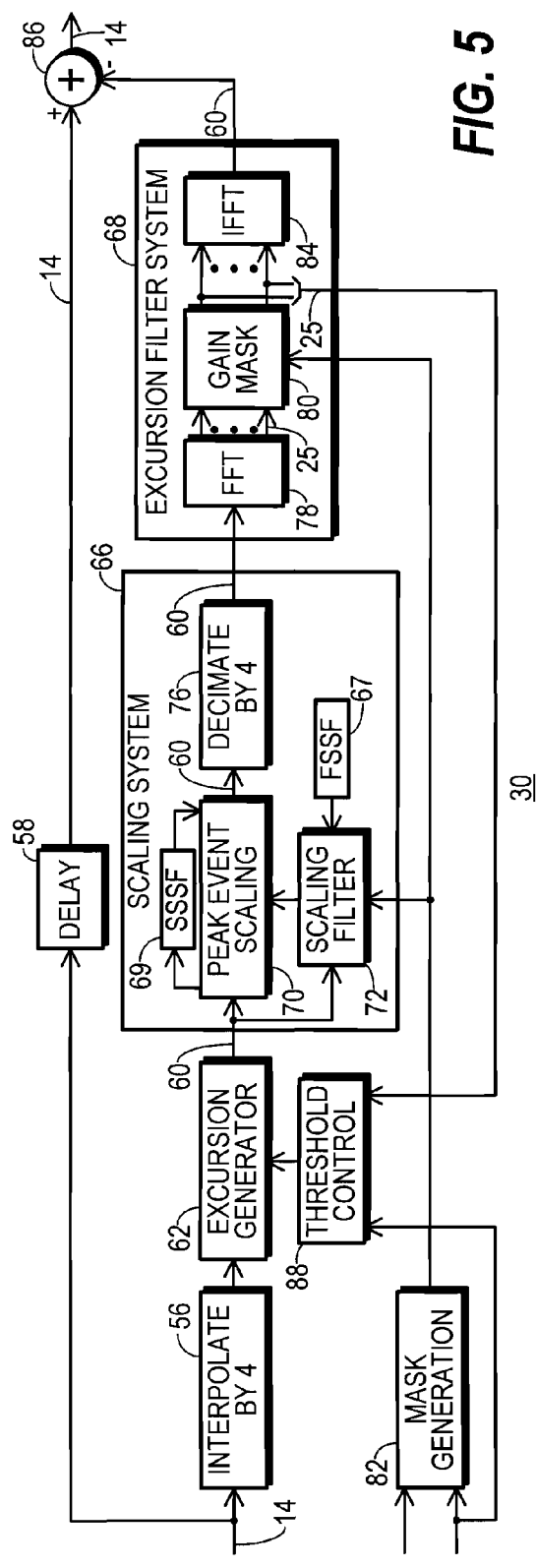
FIG. 5 shows a block diagram of a second embodiment of a PAPR reduction section of the transmitting unit of FIG. 2.

FIG. 5 shows a block diagram of a second embodiment of PAPR reduction section 30. This embodiment of PAPR reduction section 30 is more sophisticated than the version depicted in FIG. 3. This FIG. 5 embodiment of PAPR reduction section 30 is more compatible with the teaching of U.S. Publication No. 2007/0254592, but achieves improvements in power consumption.

In accordance with this FIG. 5 embodiment of PAPR reduction section 30, the version of communication signal 14 provided by modulator 20 is applied to an interpolator 56 and to a delay element 58. Interpolator 56 may be configured to increase the sampling rate of communication signal 14 by a factor of four to accommodate an extended-bandwidth excursion signal 60 generated downstream.

In one embodiment, the interpolation function may be moved to IFFT section 28 in modulator 20 (FIG. 2). In this embodiment, to increase the sampling rate by a factor of four the block size of the IFFT operation is increased by a factor of four, and the block is padded with null values. This embodiment is desirable because it imposes a periodicity constraint on the rate-increased time domain version of communication signal 14 processed by PAPR reduction section 30.

Figure 6:
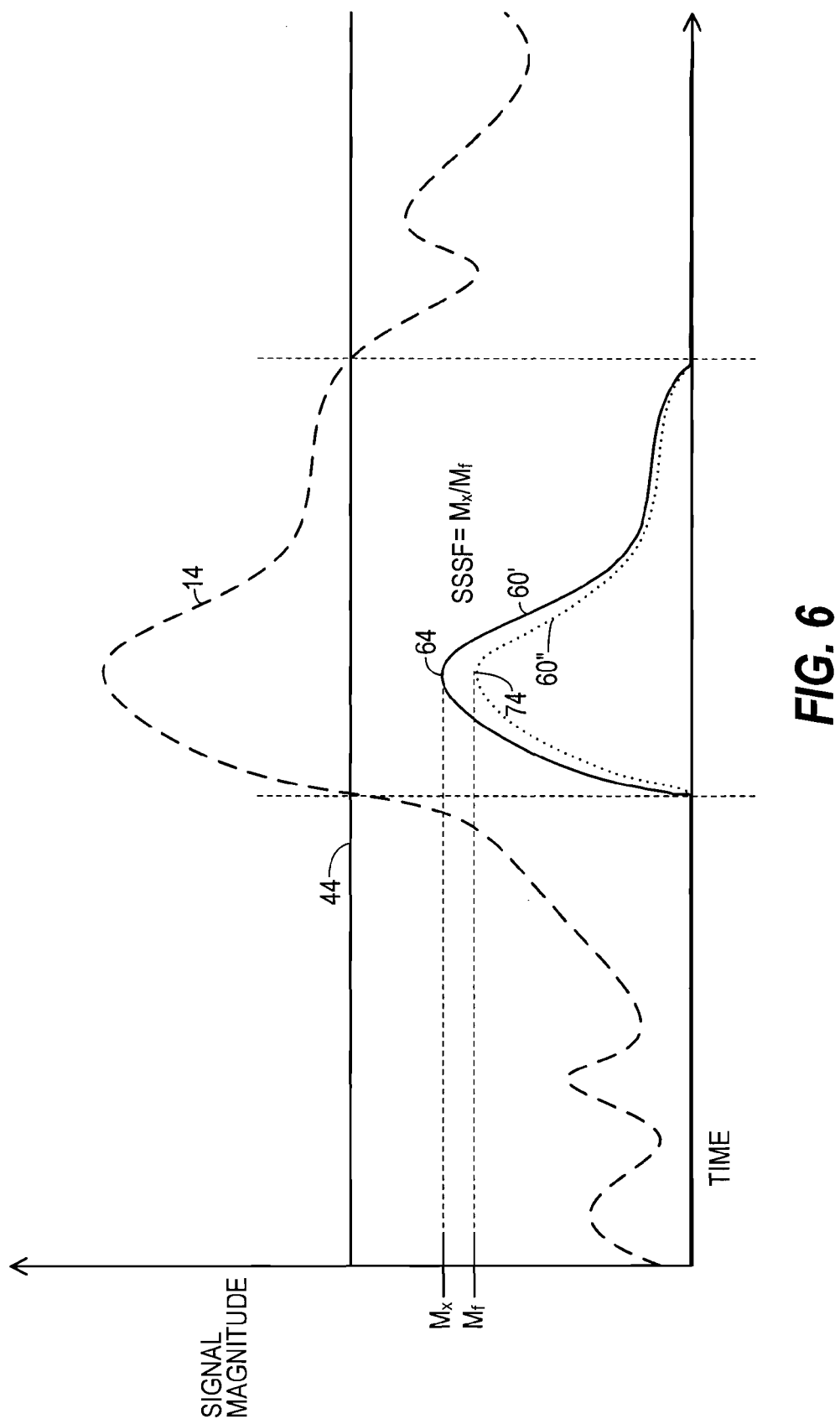
FIG. 6 graphically shows a communication signal along with raw and processed excursion waveforms used by a scaling system of the PAPR reduction section of FIG. 5.

FIG. 6 graphically shows the version of communication signal 14 provided by interpolator 56 along with raw and processed excursion signal 60 waveforms. Referring to FIGS. 5-6, communication signal 14 passes from interpolator 56 to an excursion generator 62. Excursion generator 62 forms excursion signal 60 in a raw form 60' by performing a function nearly opposite to that performed by limiter 46 (FIG. 3). Excursion generator 62 substitutes zero magnitude samples for all samples in communication signal 14 less than threshold 44, and passes all samples having a magnitude greater than or equal to threshold 44, but reduced in magnitude by the magnitude of threshold 44. Thus, the raw version of excursion signal 60 formed in excursion generator 62 conveys the portion of communication signal 14 that exceeds threshold 44. Excursion signal 60 is further processed within PAPR reduction section 30 and eventually recombined with communication signal 14. FIG. 6 depicts an arbitrary example in which a single raw peak event 64 occurs within a symbol period. But any number of raw peak events may be present, as taught in more detail in the above-mentioned U.S. Publication No. 2007/0254592.

With continued reference to FIGS. 5-6, the raw version of excursion signal 60 formed in excursion generator 62 is a time domain signal that passes to a scaling system 66, and a scaled version of excursion signal 60 passes from scaling system 66 to an excursion filter system 68. In general, scaling system 66 scales excursion signal 60 and excursion filter system 68 then filters excursion signal 60.

In the preferred embodiment, scaling system 66 scales the raw version of excursion signal 60 in accordance with a first stage scale factor (FSSF) 67 and a second stage scale factor (SSSF) 69. In other words, for each symbol period a scaled version of excursion signal 60 generated by scaling system 66 exhibits the magnitude of the raw version of excursion signal 60 generated by excursion generator 62 multiplied by both the first stage and second stage scale factors. As is discussed in more detail below, first stage scale factor 67 is applied to all samples in a given symbol period and changes slowly from symbol-period to symbol-period. Thus, first stage scale factor 67 is applied within scaling system 66 for convenience, but could alternatively be applied elsewhere within the signal path of excursion signal 60. Second stage scale factor 69 is specifically crafted for each raw peak event 64 discovered in a given symbol period and separately applied to each peak event. In other words, several second stage scale factors 69 may be determined during a given symbol period when several raw peak events 64 occur within the given symbol period, with each second stage scale factor 69 being applied to its own raw peak event 64.

The raw version of excursion signal 60 formed in excursion generator 62 is supplied to a peak event scaling section 70 of scaling system 66 and to a scaling filter 72 of scaling system 66. The goal of scaling filter 72 is to estimate, duplicate, approximate, or simulate the transfer function that will be applied to excursion signal 60 in excursion filter system 68. Thus, scaling filter 72 pre-filters excursion signal 60 and processes excursion signal 60 into a filtered form 60". This filtered form 60" of excursion signal 60 exhibits a processed peak event 74 that exhibits less magnitude than peak event 64. When multiple raw peak events 64 are present in a symbol period, a corresponding set of processed peak events 74 will likewise be present.

In the preferred embodiment, significant power savings are achieved by simplifying scaling filter 72. Rather than perform a power-intensive IFFT operation on a gain mask generated for excursion filter system 68, as taught in the above-mentioned U.S. Publication No. 2007/0254592, scaling filter 72 is configured to exhibit relatively static temporal characteristics and a gain characteristic that may change on a symbol-period by symbol-period basis. The gain of scaling filter 72 represents first stage scale factor 67, which is applied to excursion signal 60 and establishes the magnitude of processed peak events 74. Scaling filter 72 and the calculation of first stage scale factor 67 is discussed in more detail below.

Peak event scaling section 70 parses the raw, time domain form of excursion signal 60 into its separate raw peak events 64 and convolves each raw peak event 64 with scaling filter 72 to identify the second stage scale factor 69 to be applied to each raw peak event. The second stage scale factor(s) 69 are determined to be the ratio of the magnitude of a raw peak event 64 to the magnitude of its corresponding processed peak event 74.

After scaling in peak event scaling section 70, excursion signal 60 is processed to lower the sampling rate and reduce power consumption in a decimation section 76. In one embodiment, decimation section 76 first filters the scaled version of excursion signal 60 to remove frequency components outside the allocated frequency band for transmitting unit 12, then ignores three out of every four samples to decimate by a factor of four.

Following decimation, the scaled version of excursion signal 60 passes to an FFT section 78 of excursion filter system 68. FFT section 78 transforms this time domain, scaled version of excursion signal 60 into a frequency domain signal, with a frequency bin for each subcarrier 25 conveyed by communication signal 14.

In one embodiment, the decimation function of section 76 may be moved to FFT section 78 in excursion filter system 68. In this embodiment, to decrease the sampling rate by a factor of four the block size of the FFT operation is increased by a factor of four to accommodate the greater incoming block size, but all frequency bins outside the frequency range of interest on the frequency domain side of the FFT are ignored. This embodiment is desirable because it imposes a periodicity constraint on the rate-decreased frequency domain version of communication signal 14 processed by excursion filter system 68.

A gain mask section 80 performs a dot product multiplication of the frequency domain version of excursion signal 60 by gain values that are established for each subcarrier 25 and updated each symbol period. The formation of gain mask section 80 in a power-efficient manner is discussed in more detail below in connection with a mask generation process 82, which FIG. 5 depicts as being coupled to and driving gain mask 80 and scaling filter 72.

After frequency-domain gain adjustments are made in gain mask section 80, excursion signal 60 passes to an IFFT section 84 to convert excursion signal 60 back into a time domain signal. Together, FFT section 78, gain mask section 80, and IFFT section 84 perform a filtering function on the time domain version of excursion signal 60. Due to the scaling that takes place in scaling system 66, the magnitude of the peaks in the filtered version of excursion signal 60 provided by excursion filter system 68 should match the magnitude of those peaks in communication signal 14 that exceed threshold 44.

The version of excursion signal 60 generated by excursion filter system 68 is recombined with communication signal 14 at an excursion reducer 86. In the preferred embodiment, the combination which takes place at excursion reducer 86 adds excursion signal 60 out-of-phase with communication signal 14 so that a subtraction operation results. Delay element 58 is configured to temporally align communication signal 14 with this version of excursion signal 60, which has been delayed relative to the version of communication signal 14 supplied to PAPR reduction section 30 by the operation of excursion generator 62, scaling system 66, and excursion filter system 68. As a result of the operation of excursion reducer 86, those peaks in communication signal 14 that exceed threshold 44 are cancelled. Spectral regrowth is curtailed, but noise power is added during the combination operation of excursion reducer 86. As discussed in more detail below, gain mask section 80 and first stage scale factor 67, which represents the gain of scaling filter 72, are configured to add as much noise power as possible up to established noise limits so that as much PAPR reduction may be achieved as possible.

FIG. 5 shows a threshold control section 88 which receives inputs from gain mask 80 and controller 40 and which supplies threshold 44 to excursion generator 62. In the preferred embodiment, threshold control section 88 implements a feedback control loop that maintains threshold 44 at an optimum level for a current mix of channel types. But the use of a feedback control loop for this purpose is not a requirement of the present invention. Since the gains established by gain mask 80 are controlled to meet established noise limits, changes in threshold 44 tend to have less effect. Such changes may be amplified or counteracted through the operation of gain mask section 80 to maintain the established noise limits.

FIG. 7 shows a flow chart of an exemplary mask generation process 82 implemented to effect PAPR reduction in transmitting unit 12. Mask generation process 82 may be implemented in transmitting unit 12 under the control of software executed by controller 40 (FIG. 2). Desirably, mask generation process 82 is configured so that transmitting unit 12 consumes as little power as possible. In general, mask generation process 82 defines a gain mask used by gain mask section 80 (FIG. 5) and first stage scale factor 67, which corresponds to the gain mask.

FIG. 8 shows a flow chart of an exemplary epoch initialization subprocess 90 of mask generation process 82. Referring to FIGS. 7-8, epoch initialization subprocess 90 may be performed occasionally, preferably less frequently than once every symbol period. The tasks outlined for epoch initialization subprocess 90 may be performed more frequently without harming the effectiveness of PAPR reduction in transmitting unit 12, but at the expense of more power consumption. Epoch initialization subprocess 90 includes a task 92 to obtain a normalized sinc function for use as scaling filter 72 (FIG. 5).

FIG. 9 graphically shows an exemplary data structure 94 which defines scaling filter 72 and is stored in memory 42 (FIG. 2). In another embodiment, data structure 94 is calculated using predetermined programming code from memory 42 when task 92 is performed. Data structure 94 is predetermined so that scaling filter 72 will implement a transfer function approximating a sinc function having an established gain (e.g., "1") and having zero crossings that correspond to the application. For example, zero crossings may desirably be arranged to be compatible with an inverse Fourier transform of a frequency pulse one subcarrier wide. But in one embodiment several sinc data structures 94 are stored in memory 42 and an appropriate one of the several data structures 94 selected in task 92.

In one embodiment, task 92 directly causes data structure 94 to be used as the taps of a finite impulse response (FIR) filter which serves as scaling filter 72. In another embodiment, scaling filter 72 may be altered each symbol period by scaling the taps specified in data structure 94 using the first stage scale factor 67 established for the symbol period, as is discussed below. In either embodiment, scaling filter 72 is predetermined and stored in memory 42 prior to the generation of the communication signal 14 on which it will operate, and very little time and power are consumed in forming scaling filter 72 on a per symbol period basis.

In a preferred embodiment, even though several hundred samples may be processed each symbol period, scaling filter 72 need implement only an approximation of a sinc function that is a few or perhaps a few dozen taps in length. The use of such an approximation filter allows data structure 94 to be small in size and further reduces processing requirements and power consumption.

Referring back to FIG. 8, epoch initialization subprocess 90 also includes a task 96 which obtains the average power for each subcarrier 25 ($P_{sk}$) conveyed by communication signal 14. This parameter, or these parameters, may be obtained from the gain settings used in gain section 26 (FIG. 2), perhaps adjusted by a common mode gain setting. In some modern communication standards, all data subcarriers 25 are transmitted at equal power, and all pilot subcarriers 25 may be transmitted at the same power or a known greater power. These power settings do not change frequently, so task 96 may be included in epoch initialization process 90. But in other OFDM and OFDMA systems power levels may diverge more between subcarriers 25 and change on a symbol-period by symbol-period basis. In such applications, task 96 is desirably performed more frequently. Task 96 may obtain a single parameter that applies to all subcarriers 25, a couple of parameters that respectively apply to data and pilot subcarriers 25, or a vector of parameters, with one parameter for each subcarrier.

Epoch initialization subprocess 90 also includes a task 98 which obtains a table for translating each possible channel type into the maximum acceptable noise permitted for the channel type.

FIG. 10 shows an exemplary epoch channel type table 100 which may be obtained or formed in task 98. A plurality, representing a number smaller than the number of subcarriers 25, of channel types 102 is defined for use in communication system 10. Each channel type 102 corresponds to a distinct modulation order and convolutional coding rate. Each subcarrier 25 used in communication system 10 is configured in accordance with one of channel types 102. That configuration remains valid for at least a symbol period, and the assignment of channel types 102 to subcarriers 25 changes on a symbol-period by symbol-period basis. Each channel type 102 has its own SNR requirements that should be met at receiving unit 16 in order for communication signal 14 to be successfully demodulated and decoded. These SNR requirements are independent of the power at which communication signal 14 is broadcast from transmitting unit 12. These SNR requirements are translated back to the transmitting unit as noise limits, typically expressed as error vector magnitude (EVM) specifications. Noise represents the amount of power in a signal found in any component or aspect of the signal that deviates from an ideal version of the signal. EVM is the ratio of the total amount of noise power in a subcarrier 25 to the total signal power in that subcarrier 25. It is usually specified as a percentage, equal to one-hundred divided by the square-root of the SNR.

The maximum acceptable noise parameters specified in table 100 represent a product of EVM specifications with the average subcarrier power levels identified above in task 96 indicating the amount of noise power that corresponds to the EVM specifications at the current power level of communication signal 14 on a per subcarrier basis. Table 100 is also configured to reflect the implementation of two different EVM specifications for each channel type 102, one for links 19' that convey voice data and the other for links 19" that convey non-voice data. Thus, the same channel type 102 may be operated to meet different EVM specifications, depending upon whether that channel type 102 is being used to convey voice data or non-voice data.

FIG. 10 also depicts a data rate column in table 100 for informational purposes only to indicate exemplary differences in data rates achievable with different channel types 102 in accordance with a currently popular communication standard. This column need not be present in a table 100 obtained in task 98. Generally, the maximum acceptable noise limits specified in table 100 are inversely related to data rate, with more noise power being permitted for the slower data rate channel types 102. And, for each channel type 102, more noise power is permitted when the channel type 102 is used in a link 19" which communicates non-voice data than when the channel type 102 is used in a link 19' which communicates voice data. As discussed above, a greater amount of noise power is permitted in non-voice data links 19" because such links 19" may be block encoded using a longer duration block code which provides more coding gain and permits receiving unit 16 to demodulate and decode the link 19" at a lower SNR. Thus, the greatest amount of noise power is permitted in subcarriers 25 using the lowest data rate channel type 102 when used in a non-voice data link 19", and the least amount of noise power is permitted in subcarriers 25 using the highest data rate channel type 102 when used in a voice data link 19'.

Referring back to FIG. 8, the ellipsis indicates that any number of other tasks may be included in epoch initialization subprocess 90. But eventually, epoch initialization subprocess 90 completes, and, as indicated in FIG. 7, program control then flows to a symbol initiation subprocess 104.

FIG. 11 shows a flow chart of an exemplary symbol initialization subprocess 104 of mask generation process 82. Symbol initialization subprocess 104 is performed once each symbol period.

Symbol initialization subprocess 104 includes a task 106 which estimates the analog-generated distortion noise power and calculates subcarrier allocations for the analog-generated distortion noise power. In one embodiment, an estimate of analog-generated distortion noise power is collected from predistortion section 32 (FIG. 2) over each symbol period, and this collected noise power is allocated equally to all subcarriers 25. Consequently, task 106 may obtain a noise power value for a symbol period, divide that value by the number of subcarriers 25 to produce a single parameter, and use that single parameter in association with each subcarrier.

Analog-generated distortion noise power is a function of the configuration of the analog components used in analog components section 34 (FIG. 2). Consequently, their configuration may drift somewhat with temperature and aging, but the amount of analog-generated distortion noise power may be viewed as being relatively constant. Thus, in another embodiment, a predetermined, static constant value may be obtained from memory 42 (FIG. 2) and used in association with each subcarrier 25 at task 106. In an embodiment where the signal power applied in the different subcarriers 25 may vary widely from symbol-period to symbol-period, an FFT may be performed in task 106 on the estimates of analog-generated distortion noise power from predistortion section 32 for each symbol period, with different analog-generated distortion noise power estimates being specifically obtained for each subcarrier.

Symbol initiation subprocess 104 also includes a task 108 which corresponds to FFT section 78, discussed above in connection with FIG. 5. Specifically, a Fourier transform is performed on the scaled version of excursion signal 60 generated by scaling system 66. Task 108 is performed in preparation for upcoming tasks which utilize the frequency domain version of the scaled excursion signal 60.

In addition, symbol initiation subprocess 104 includes a task 110 in which various counters and accumulators that are discussed below are cleared in preparation for accumulation and counting operations to take place later.

Any number of other tasks may be included in symbol initiation subprocess 104. But eventually, symbol initiation subprocess 104 completes, and, as indicated in FIG. 7, program control flows to a power accumulation subprocess 112.

FIG. 12 shows a flow chart of an exemplary power accumulation subprocess 112 of mask generation process 82. Power accumulation subprocess 112 is performed once each symbol period and implements a programming loop that makes a quick evaluation of each subcarrier 25 to determine the amount of power allocated for use by subcarriers 25 assigned to the various channel types 102 and the numbers of subcarriers 25 to which the various channel types 102 are assigned. In a task 114, subprocess 112 maintains the programming loop by identifying the next subcarrier 25 to evaluate. Then, a task 116 identifies the channel type 102 and link 19 (voice 19' or non-voice 19") of this subcarrier 25. Task 116 may be performed by reference to the same data structures that are used in controlling modulation and convolutional coding section 24 of modulator 20 (FIG. 2). These data structures associate channel types 102 with communication links 19 and also associate subcarriers 25 with channel types 102.

Following task 116, a task 118 obtains the excursion power from the scaled version of excursion signal 60 for the identified subcarrier 25 from the appropriate bin of the FFT operation performed above in task 108 (FIG. 11) and adds the excursion power to an accumulator established for the identified channel type 102 and link 19.

FIG. 13 shows an exemplary channel type accumulation table 120 which may be generated by power accumulation subprocess 112. As shown in FIG. 13, a voice power accumulator 122 and a non-voice power accumulator 124 are provided for each channel type 102. Referring to FIGS. 12-13, task 118 adds the identified subcarrier's excursion power to the value currently present in the appropriate accumulator 122 or 124. Then, a task 126 is performed to increment a counter for the identified channel type 102 and link 19 (voice 19' or non-voice 19"). FIG. 13 further shows that a voice counter 128 and a non-voice counter 130 are provided in table 120 for each channel type 102. Task 126 adds one to the value currently present in the appropriate counter 128 or 130.

Following task 126, a query task 132 is performed to maintain the programming loop of power accumulation subprocess 112. Program control flows from query task 132 back to task 114 to identify then evaluate another subcarrier 25 until all subcarriers 25 have been evaluated. When all subcarriers 25 have been evaluated, channel type accumulation table 120 is complete and program flow then eventually exits subprocess 112. At this point, table 120 indicates how much power from the scaled version of excursion signal 60 for the current symbol period is allocated to the various channel types 102 for voice data links 19' and non-voice data links 19" as well as the number of subcarriers 25 to which the various channel types 102 for voice data links 19' and non-voice data links 19" have been assigned. While one iteration of the programming loop is performed for each subcarrier 25, and several hundred subcarriers 25 may be evaluated in each symbol period, processing time and power consumption are reasonable. The evaluation of each subcarrier 25 may be conducted primarily using fast, low power table look-up operations and addition-type arithmetic operations.

Referring to FIG. 7, a channel type evaluation subprocess 134 is performed after power accumulation subprocess 112.

Figures 14, 15:
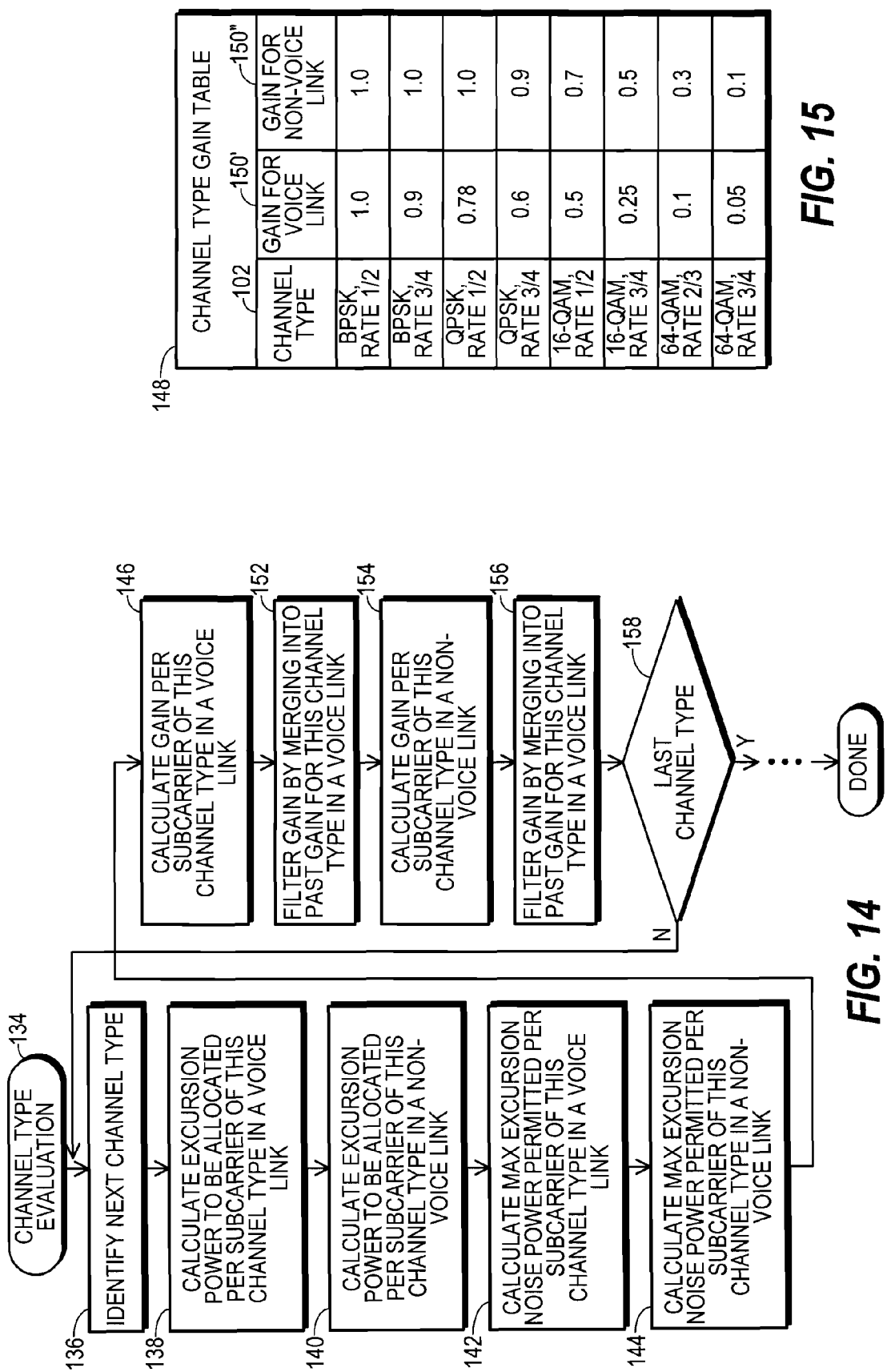
FIG. 14 shows a flow chart of an exemplary channel type evaluation subprocess of the mask generation process of FIG. 7.
FIG. 15 shows an exemplary channel type gain table which may be generated by the channel type evaluation subprocess of FIG. 14.

FIG. 14 shows a flow chart of an exemplary channel type evaluation subprocess 134 of mask generation process 82. Channel type evaluation subprocess 134 implements a programming loop that makes a quick evaluation of each channel type 102 to determine two different gain parameters to use in connection with each channel type 102, where one of the two gain parameters is associated with voice data links 19' and the other is associated with non-voice data links 19". These gains will eventually be used in gain mask section 80 (FIG. 5).

In a task 136, subprocess 134 maintains the programming loop by identifying the next channel type 102 to evaluate. Then, a task 138 calculates the amount of excursion power to be allocated to each subcarrier 25 that conveys a voice data link 19' using this identified channel type 102. Task 138 may divide the accumulated power by the counted number of subcarriers from the appropriate accumulator 122 and counter 128 of table 13 (FIG. 13). Next, a task 140 calculates the amount of excursion power to be allocated to each subcarrier 25 that conveys a non-voice data link 19" using this identified channel type 102. Task 140 may divide the accumulated power by the counted number of subcarriers 25 from the appropriate accumulator 124 and counter 130 of table 13 (FIG. 13).

Following tasks 138 and 140, a task 142 calculates the maximum excursion noise power permitted per subcarrier 25 for this identified channel type 102 in a voice data link 19'. Task 142 may reduce the maximum acceptable noise for the corresponding channel type 102 and link type 19 in table 100 (FIG. 10) by the analog-generated distortion noise for each subcarrier 25, as determined above in task 106. Then, a task 144 does the same thing for the identified channel type 102 when used in a non-voice data link 19". Specifically, task 144 may reduce the maximum acceptable noise for the corresponding channel type 102 and link type 19 in table 100 (FIG. 10) by the analog-generated distortion noise for each subcarrier 25, as determined above in task 106.

FIG. 15 shows an exemplary channel type gain table 148 which may be generated by channel type evaluation subprocess 134. Referring to FIGS. 14-15, following tasks 142 and 144, a task 146 calculates a gain 150' to apply in any voice data link 19' subcarrier 25 that is assigned the identified channel type 102. The gain 150' represents the ratio of the excursion power available per subcarrier 25 for allocation, as determined above in task 138, divided by the maximum excursion noise power permitted, as determined above in task 142. The division operation of task 146 should return a result that is less than or equal to one due to the operation of scaling system 66 (FIG. 5). But inaccuracies may nevertheless be present, and task 146 may limit its result to being less than or equal to one. Next, a task 152 filters this current gain 150' by merging the newly calculated gain 150' into a past filtered gain value 150' for a voice data link 19' of the same channel type 102. In the preferred embodiment, an infinite impulse response (IIR) filter is implemented.

Following tasks 146 and 152, tasks 154 and 156 perform the same calculations for non-voice data link 9" subcarriers of the identified channel type. Specifically, a task 154 calculates a gain 150" to apply in any non-voice data link 19" subcarrier that is assigned the identified channel type 102 by performing a division operation. The division operation divides the excursion power available per subcarrier for allocation, as determined above in task 140 by the maximum excursion noise power permitted, as determined above in task 144. Task 156 then performs an IIR filter operation to merge this newly calculated gain value 150" into a past filtered gain value 150".

The use of filtering in tasks 152 and 156 causes the gain values 150' and 150" to change more slowly and smoothly than would result if the filtering of tasks 152 and 156 were omitted. This allows PAPR reduction section 30 to respond to and maintain an average EVM rather than an instantaneous EVM. Since the instantaneous EVM exhibits considerable variance about the average EVM, the use of filtering in tasks 152 and 156 allows EVM noise limits to be more closely held without either adding too much or too little PAPR reduction noise power to communication signal 14.

Following tasks 154 and 156, a query task 158 is performed to maintain the programming loop of channel type evaluation subprocess 134. Program control flows from query task 158 back to task 136 to identify then evaluate another carrier type 102 until all carrier types 102 have been evaluated. Program control eventually exits subprocess 134 when task 158 determines that all channel types have been evaluated.

One row of table 148 as depicted in FIG. 15 may be completed in each iteration of the programming loop of subprocess 134. At the completion of subprocess 134, filtered gain values 150' and 150" are determined for each channel type 102. The specific gain values 150' and 150" depicted in FIG. 15 are arbitrary and will change from symbol-period to symbol-period. Generally, higher gains are associated with lower data rates. And, higher gains are associated with non-voice data links 19" than with voice data links 19' of the same channel types 102. The calculation of different gain values 150' and 150" for each channel type 102 will cause PAPR reduction section 30 to combine noise into communication signal 14 at two different power levels for each channel type 102. For a given channel type 102, more noise power is combined into communication signal 14 for non-voice data links 19" so that more PAPR reduction may be achieved. The gains 150' and 150" are responsive to analog-generated distortion noise as well as to EVM specifications, signal power allocated in each subcarrier, and to the power in the particular scaled version of excursion signal 60 that may be present in any given symbol period.

Subprocess 134 includes a programming loop that is iterated only a few times compared to the number of subcarriers 25. Consequently, the gain calculations of subprocess 134 are achieved with very little processing time or power consumption.

FIG. 16 shows a flow chart of an exemplary gain mask assignment subprocess 160 of the mask generation process 82 (FIG. 7). Subprocess 160 is performed after subprocess 134. Gain mask assignment subprocess 160 is performed once each symbol period and implements a programming loop that makes a quick evaluation of each subcarrier 25 to assign the gain values 150' and 150" determined above in subprocess 134 (FIGS. 14-15) to specific subcarriers 25. In a task 162, subprocess 160 maintains the programming loop by identifying the next subcarrier 25 to evaluate. Then, tasks 164 and 166 together identify the channel type 102 and link 19 (voice 19' or non-voice 19") of this subcarrier 25.

FIG. 17 shows an exemplary gain mask 168 which may be generated by gain mask assignment subprocess 160. Referring to FIGS. 16-17, after tasks 164 and 166, a task 170 sets a gain value 172 in gain mask 168 in association with the subcarrier 25 last identified in task 162. Task 170 may perform a table look-up operation using channel type gain table 148 (FIG. 15) and the channel type 102 and link type 19 determined above in tasks 164 and 166. Thus, task 170 may simply move a gain value 150' or 150" from table 148 into gain mask 168. Following task 170, a query task 174 is performed to maintain the programming loop of subprocess 160. Program control flows from query task 174 back to task 162 to identify then assign a gain 172 for another subcarrier 25 until gain values 172 have been assigned for all subcarriers 25. When all subcarriers 25 have been assigned gains 172, gain mask 168 is complete and program flow then eventually exits subprocess 160.

While the programming loop of subprocess 160 iterates for each subcarrier 25, very little processing, and substantially no complex mathematical operations, are required for any iteration. Thus, subprocess 160 may still be executed quickly and consumes little power. Since a common pool of gain values 150' and 150" from channel type gain table 148 (FIG. 15) are used in populating gain mask 168, common channel types 102 of a common link type 19 have substantially the same gains 172 associated therewith. Since the gain values 150' and 150" are filtered over symbol periods, the gain values 150' and 150" themselves change slowly. But the assignments of those gain values 150' and 150" may abruptly change from symbol-period to symbol-period to track subcarrier mapping that takes place in modulator 20 (FIG. 2).

Gain mask 168 is used in gain mask section 80 (FIG. 5). In gain mask section 80, a dot product is performed between each subcarrier 25 of the frequency domain, scaled version of excursion signal 60. As a result, excursion signal 60 is processed to possess noise power at relatively low levels for voice data links 19' of each given channel type 102, or relatively high levels for non-voice data links 19" of each given channel type 102.

FIG. 18 shows a flow chart of an exemplary first stage scale factor calculation subprocess 176 of mask generation process 82 (FIG. 7). Subprocess 176 is preferably performed once per symbol period after channel type evaluation subprocess 134 (FIG. 14). Scaling filter 72 is desirably configured to estimate, duplicate, approximate, or simulate the transfer function that will be applied to excursion signal 60 in excursion filter system 68 (FIG. 5), and first stage scale factor 67 represents the gain of a desirably configured scaling filter 72. Since the transfer function that will be applied to excursion signal 60 in excursion filter system 68 is defined by gain mask 168 (FIG. 17), first stage scale factor 67 is desirably configured as a scalar value that corresponds to gain mask 168. In the preferred embodiment, subprocess 176 uses the same data that are used to form gain mask 168 in forming first stage scale factor 67 so that it corresponds to gain mask 168. But, subprocess 176 uses a far less processing-intensive technique to calculate this scalar value than is followed in forming gain mask 168.

Subprocess 176 includes a task 178 to find a weighted average of excursion noise power using channel type distribution weighting. In particular, task 178 calculates the following summation:

$$FSSF = \sum_{k=0}^{k=N-1} \alpha'_k G'_k + \alpha''_k G''_k$$

where,
FSSF=first stage scale factor
k=channel type index
N=number of channel types
$\alpha'_k$=fraction of all channel types for voice data links at channel type "k"
$\alpha''_k$=fraction of all channel types for non-voice data links at channel type "k"
$G'_k$=subcarrier gain for voice data links at channel type "k"
$G''_k$=subcarrier gain for non-voice data links at channel type "k".

Task 178 may calculate the fractions $\alpha'_k$ and $\alpha''_k$ using channel type accumulation table 120 (FIG. 13) and may obtain the gains $G'_k$ and $G''_k$ from channel type gain table 148 (FIG. 15). First stage scale factor 67 is set in task 178 in response to the distribution of channel types 102 throughout the subcarriers 25 without performing an evaluation of each subcarrier 25. And, first stage scale factor 67 is set in task 178 in response to whether the various links 19 convey voice data or non-voice data.

Following task 178, a task 182 applies first stage scale factor 67. In a preferred embodiment, the first stage scale factor 67 is applied by scaling the predetermined normalized sinc function defined by data structure 94 (FIG. 9) by first stage scale factor 67. But in an alternate embodiment, first stage scale factor 67 may be applied by multiplying excursion signal 60 by first stage scale factor 67 at another location along its signal path.

Subprocess 176 eventually exits after task 182. Referring back to FIG. 7, when program control exits subprocess 176, it eventually flows back to subprocess 104 to process the next symbol period.

Figure 19:
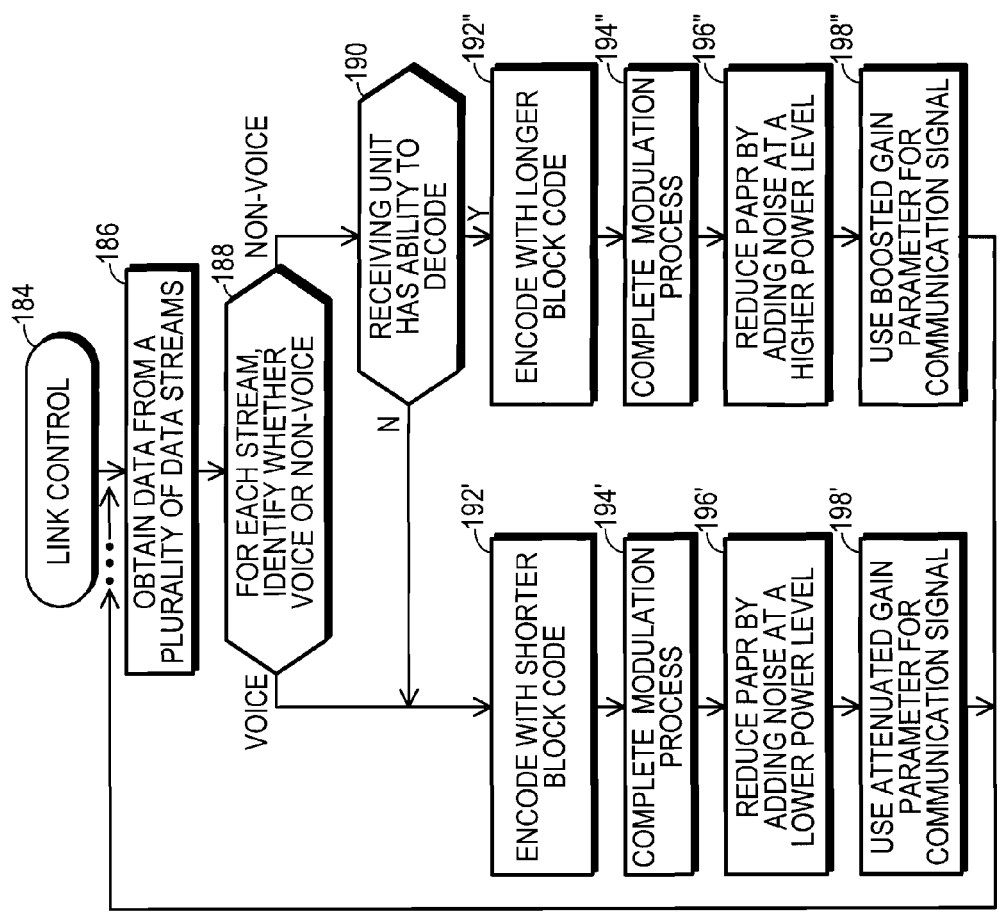
FIG. 19 shows a flow chart of an exemplary link control process implemented to effect PAPR reduction in the transmitting unit of FIG. 2.

FIG. 19 shows a flow chart of an exemplary link control process 184 implemented to effect PAPR reduction in transmitting unit 12. Link control process 184 may be implemented in transmitting unit 12 and some or all of process 184 may be under the control of software executed by controller 40 (FIG. 2). Desirably, link control process 184 is configured so that transmitting unit 12 consumes as little power as possible. In general, link control process 184 takes various actions in response to whether a communication link 19 conveys voice data or non-voice data. Process 184 informs block coding section 22 (FIG. 2) whether to implement a block code of a longer duration or of a shorter duration. Process 184 informs PAPR reduction section 30 (FIG. 2) of the subcarriers 25 that are assigned channel types 102 for voice data links 19' and non-voice data links 19" so that PAPR reduction noise power may be configured accordingly. And, process 184 causes gain sections 26 and/or 38 to apply a boosted gain when a greater amount of PAPR reduction results from an increase in non-voice data link conveyances or to apply an attenuated gain when a lesser amount of PAPR reduction results from an increase in voice data link conveyances.

Process 184 includes a task 186 which may be carried out in block coding section 22 (FIG. 2). In task 186, data from a plurality of data streams 18 (FIG. 2) are obtained. Next, a query task 188 evaluates control data associated with data stream 18 to determine whether the data streams 18 convey voice data or non-voice data. For non-voice data streams, program control flows to a query task 190, and for voice data streams, program control flows to a task 192'. In query task 190, process 184 determines whether the receiving unit 16 for which the non-voice data stream is intended has an ability to decode a data block encoded with the block code of a longer duration. Task 190 may verify if the receiving unit 16 has this ability by sending a request message to the receiving unit 16 using the block code of shorter duration, and then receiving an acknowledgement in return. Or, communication system 10 may be configured so that all receiving units 16 automatically have this ability. Or, other data, such as a model number, serial number, capabilities list, or the like, describing the receiving unit 16 may be evaluated in making this determination. When task 190 fails to verify an ability in the receiving unit 16 to decode the block code of longer duration, program flow proceeds to task 192'. When task 190 verifies an ability in the receiving unit 16 to decode the block code of longer duration, program flow proceeds to a task 192".

In accordance with task 192', block coding section (FIG. 2) encodes the voice data stream 18 using a block code of a shorter duration, while in accordance with task 192", block coding section 22 (FIG. 2) encodes the non-voice data stream 18 using a block code of a longer duration. The block code of longer duration may be decoded in the targeted receiving unit at a lower SNR ratio. This allows PAPR reduction section 30 to place more peak reduction noise into those subcarriers 25 that are used to convey the non-voice data stream 18 and thereby achieve greater amounts of PAPR reduction.

Following task 192' for a voice data stream 18, and following task 192" for a non-voice data stream 18, tasks 194' and 194" are respectively performed. During each of tasks 194' and 194", modulator 20 (FIG. 2) completes the modulation process. In other words, the data streams 18 are modulated according to a channel type 102, assigned subcarriers 25, and converted into combined, time domain communication signal 14.

Following task 194' for a voice data stream 18, and following task 194" for a non-voice data stream 18, tasks 196' and 196" are respectively performed. During task 196', PAPR reduction section 30 reduces PAPR by adding noise at a lower power level; and, during task 196", PAPR reduction section 30 reduces PAPR by adding noise at a higher power level. As discussed above, PAPR reduction section 30 causes noise power to be distributed through subcarriers 25. Greater amounts of PAPR reduction correspond to greater amounts of noise power being distributed through subcarriers 25. Task 196" will cause a greater amount of noise power to be distributed through subcarriers 25 than task 196', all other factors remaining constant. For the FIG. 5 embodiment of PAPR reduction section 30, tasks 196' and 196" inform PAPR reduction section 30 of the voice or non-voice characterization of links 19 to which channel types 102 and subcarriers 25 are assigned. As a result, gain mask 168 is altered in response to these characterizations, causing noise power to be altered correspondingly.

Following task 196' for a voice data stream 18, and following task 196" for a non-voice data stream 18, tasks 198' and 198" are respectively performed. During task 198', gain sections 26 and/or 38 use a relatively attenuated gain parameter for communication signal 14; and, during task 198", gain sections 26 and/or 38 use a relatively boosted gain parameter for communication signal 14. In one embodiment, the selected subcarriers 25 which receive increased PAPR reduction noise power in accordance with task 198" have their gains boosted accordingly in gain section 26. Likewise, the selected subcarriers 25 which receive decreased PAPR reduction noise power in accordance with task 198' have their gains attenuated accordingly in gain section 26. In another embodiment, a common mode gain, such as that applied in gain section 38, either boosts or attenuates gain for all subcarriers 25 in response to whether an increase or decrease in non-voice data link conveyances is being experienced. Following tasks 198' or 198", program control eventually flows back to task 186 to track changes in the voice or non-voice character of data streams 18.

Figure 20:
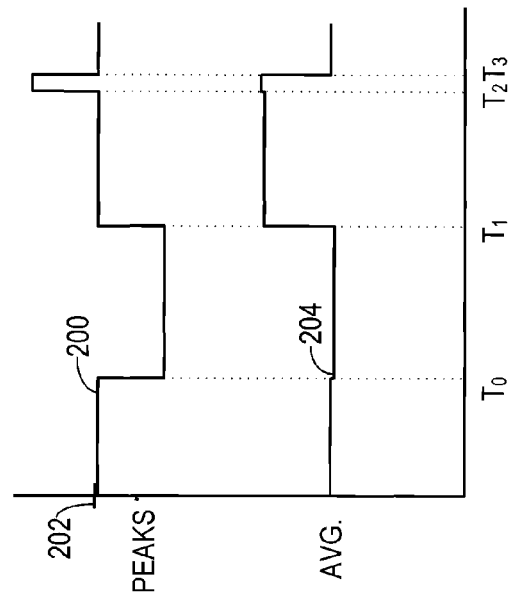
FIG. 20 shows an exemplary timing chart depicting an implementation of the link control process of FIG. 19.

FIG. 20 shows an exemplary timing chart depicting an implementation of the link control process 184. FIG. 20 depicts an arbitrary scenario in which the voice and non-voice character of data streams 18 changes. As shown prior to time $T_0$ in FIG. 20, peaks of communication signal 14 occasionally reach a peak magnitude 200, and peak magnitude 200 is maintained slightly beneath a maximum linear amplification limit 202. But an average magnitude 204 of communication signal 14 is significantly lower than peak magnitude 200. The voice or non-voice character of data streams 18 changes in the direction of receiving a greater number of non-voice data streams 18 at time $T_0$.

After $T_0$, PAPR reduction section 30 will begin introducing a greater amount of noise power into communication signal 14, with the noise power being configured to reduce PAPR. For the FIG. 3 embodiment of PAPR reduction section 30, this may occur by reducing threshold 44. For the FIG. 5 embodiment of PAPR reduction section 30, this may occur by altering gain mask 168 (FIG. 17). Due to an increased amount of PAPR reduction, peak magnitude 200 is reduced between time $T_0$ and time $T_1$.

At time $T_1$, transmitting unit 12, and perhaps gain section 38 thereof, recognize that peak magnitude 200 has actually been reduced and boost the gain for communication signal 14. Some time may transpire between time $T_0$ and time $T_1$ because transmitting unit 12 may be reluctant to conclude that peak magnitude 200 has actually been reduced. The effect of boosting gain takes place after time $T_1$. Peak magnitude 200 is returned to its prior level just slightly beneath maximum linear amplification limit 202, and average magnitude 204 is increased considerably. Transmitting unit 12 continues to operate in this boosted gain state until time $T_2$. For each link which operates with the boosted gain, SNR at the corresponding receiving units 16 is boosted accordingly. In response, in accordance with conventional link maintenance procedures, transmitting unit 12 will begin modulating using channel types 102 having higher data rates. Consequently, a given amount of data will be communicated in less time between times $T_1$ and $T_2$, and power consumption will be reduced.

At time $T_2$ the voice or non-voice character of data streams 18 again changes in the example of FIG. 20, but now it changes in the direction of receiving fewer non-voice data streams 18. As a consequence, after time $T_2$ PAPR reduction section 30 reduces the amount of noise power it introduces into communication signal 14, and peak magnitude 200 increases, perhaps above maximum linear amplification limit 202. Transmitting unit 12 is likely configured to quickly detect this situation instantly and reduce gain accordingly to prevent nonlinear amplification. Accordingly, at time $T_3$, transmitting unit 12 attenuates the gain for communication signal 14, causing peak magnitude 200 to return to its target level slightly beneath maximum linear amplification limit 202, and average magnitude 204 is reduced as well. A power savings results because transmitting unit 12 has been able to operate at higher data rates between times $T_1$ and $T_2$ when compared to transmitting units that operate in accordance with a single voice-data-configured EVM constraint.

In summary, at least one embodiment of the present invention provides a transmitting unit that achieves power consumption savings by implementing a particularly efficient technique for defining a scaling filter used in connection with PAPR reduction. And, in accordance with at least one embodiment of the present invention, a transmitting unit achieves power consumption savings by assigning different EVM constraints to different types of communication links, then introducing more PAPR reduction noise power into the communication signal in those situations where the receiving unit can decode a block code of longer duration and greater coding gain. A given amount of data may be transmitted in less time, resulting in a power savings.

Although the preferred embodiments of the invention have been illustrated and described in detail, it will be readily apparent to those skilled in the art that various modifications and adaptations may be made without departing from the spirit of the invention or from the scope of the appended claims. For example, those skilled in the art will appreciate that the specific functions depicted herein through the use of block diagrams may be partitioned in equivalent but different ways than shown and discussed herein, and the processes, subprocesses, and tasks specifically described herein may be organized in equivalent but vastly different ways. Such equivalent but different ways and the modifications and adaptations which may be implemented to achieve them are to be included within the scope of the present invention.

What is claimed is:

1. A method of operating a transmitting unit to reduce peak to average power ratio (PAPR) comprising:

generating a communication signal which is processed within and broadcast from said transmitting unit;

generating an excursion signal from said communication signal, said excursion signal being processed and recombined with said communication signal within said transmitting unit, and said excursion signal having a raw peak event;

obtaining a predetermined normalized scaling filter which estimates a transfer function of an excursion filter system for said excursion signal;

determining a gain mask which defines said excursion filter system for said excursion signal, said gain mask being determined in response to a magnitude of a scaled version of said excursion signal and a noise limit for said communication signal;

filtering said excursion signal through said scaling filter to form a processed peak event;

adjusting said magnitude of said excursion signal to form said scaled version of said excursion signal, said magnitude being adjusted in response to first stage and second stage scale factors, said first stage scale factor being configured to correspond to said gain mask and said second stage scale factor being determined in response to said raw peak event and said processed peak event;

filtering said excursion signal through said excursion filter system; and combining the filtered excursion signal with said communication signal.

2. A method as claimed in claim 1 wherein:

said communication signal is generated to include a first plurality of subcarriers, wherein each of said first plurality of subcarriers is modulated in accordance with one of a second plurality of channel types, and wherein each of said second plurality of channel types corresponds to a distinct modulation order and coding rate;

said gain mask is configured so that each of said subcarriers has a gain associated therewith; and said subcarriers of common channel types have substantially the same gain associated therewith.

3. A method as claimed in claim 2 wherein:

said communication signal is configured as one of an OFDM and an OFDMA waveform having symbol periods;

said method comprises filtering said gains associated with said channel types over a plurality of said symbol periods; and changing associations of said gains to said subcarriers in each symbol period.

4. A method as claimed in claim 1 wherein said normalized scaling filter has a transfer function which approximates a sinc function.

5. A method as claimed in claim 1 wherein said normalized scaling filter is obtained from a memory.

6. A method as claimed in claim 1 wherein said predetermined normalized scaling filter is defined before generating said excursion signal from said communication signal.

7. A method as claimed in claim 1 wherein:

said transmitting unit includes analog components which process said communication signal;

said analog components introduce analog-generated distortion noise power into said communication signal;

said method additionally comprises estimating said analog-generated distortion noise power introduced into said communication signal; and said gain mask is further determined in response to said estimated analog-generated distortion noise power.

8. A method as claimed in claim 1 wherein said communication signal is configured as one of an OFDM and an OFDMA waveform.

9. A method as claimed in claim 1 wherein:

said method additionally comprises identifying whether said communication signal conveys voice data or non-voice data;

said combining activity combines noise at a first power level with said communication signal when said communication signal conveys voice data, said noise at said first power level being configured to reduce PAPR of said communication signal; and said combining activity combines noise at a second power level with said communication signal when said communication signal conveys non-voice data, said second power level being greater than said first power level, and said noise at said second power level being configured to provide a greater reduction in PAPR than results from adding said noise at said first power level.

10. A method of operating a transmitting unit to reduce peak to average power ratio (PAPR) comprising:

generating a communication signal which is processed within and broadcast from said transmitting unit, wherein said communication signal is generated to include a first plurality of subcarriers, wherein each of said first plurality of subcarriers is modulated in accordance with one of a second plurality of channel types, and wherein each of said second plurality of channel types corresponds to a distinct modulation order and coding rate;

generating an excursion signal from said communication signal, said excursion signal being processed and recombined with said communication signal within said transmitting unit, and said excursion signal having a raw peak event;

obtaining a predetermined normalized scaling filter; determining a gain mask which defines an excursion filter system for said excursion signal, said gain mask being determined in response to a magnitude of a scaled version of said excursion signal and a noise limit for said communication signal;

filtering said excursion signal through said scaling filter to form a processed peak event;

adjusting said magnitude of said excursion signal in response to first stage and second stage scale factors, said first stage scale factor being configured to correspond to said gain mask by calculating a distribution of channel types throughout said subcarriers, and setting said first stage scale factor in response to said distribution of channel types throughout said subcarriers, and said second stage scale factor being determined in response to said raw peak event and said processed peak event;

filtering said excursion signal through said excursion filter system; and combining the filtered excursion signal with said communication signal.

11. A method as claimed in claim 10 wherein said second plurality is less than said first plurality.

12. A method of operating a transmitting unit to reduce peak to average power ratio (PAPR) of a communication signal, said method comprising:

generating a communication signal;

generating an excursion signal from said communication signal, said excursion signal being processed and recombined with said communication signal within said transmitting unit, and said excursion signal having a raw peak event;

obtaining a predetermined normalized scaling filter;

determining a gain mask which defines an excursion filter system for said excursion signal;

filtering said excursion signal through said scaling filter to form a processed peak event;

identifying whether said communication signal conveys voice data or non-voice data;

adjusting a magnitude of said excursion signal in response to first and second stage scale factors, said first stage scale factor being configured in response to whether said communication signal conveys voice data or non-voice data, and said second stage scale factor being determined in response to said raw peak event and said processed peak event;

filtering said excursion signal through said excursion filter system to produce noise at said first and second power levels;

combining noise at said first power level with said communication signal when said communication signal conveys voice data, said noise at said first power level being configured to reduce PAPR of said communication signal; and combining noise at said second power level with said communication signal when said communication signal conveys non-voice data, said second power level being greater than said first power level, and said noise at said second power level being configured to provide a greater reduction in PAPR than results from combining said noise at said first power level.

13. A transmitting unit which reduces peak to average power ratio (PAPR) for a communication signal, said transmitting unit comprising:

a modulator which modulates a communication signal and is configured to include a block encoding section configured to encode said communication signal using a block code of a first duration when said communication signal conveys voice data and to encode said communication signal using a block code of a second duration when said communication signal conveys non-voice data, said second duration being longer than said first duration;

an excursion filter system coupled to said modulator and configured to generate noise at first and second power levels;

an excursion reducer configured to combine said noise at said first and second power levels with said communication signal to reduce PAPR of said communication signal; and a controller coupled to said excursion filter system and configured to evaluate whether said communication signal conveys said voice data or said non-voice data and to select one of said first and second power levels and one of said first duration and second duration block codes in response to said evaluation.

14. A transmitting unit as claimed in claim 13 wherein:

said transmitting unit additionally comprises a gain section;

said controller is configured to cause said gain section to apply a first gain parameter to said communication signal when said communication signal conveys said voice data; and said controller is configured to cause said gain section to apply a second gain parameter to said communication signal when said communication signal conveys said non-voice data, said second gain parameter being greater than said first gain parameter.

15. A transmitting unit as claimed in claim 13 wherein:

said modulator is configured so that said communication signal includes a first plurality of subcarriers modulated in accordance with one of a second plurality of channel types, where each of said second plurality of channel types corresponds to a distinct modulation order and coding rate;

said excursion filter system is configured so that said noise at said first power level is combined in some of said subcarriers modulated in accordance with one of said channel types, and said noise at said second power level is combined in others of said subcarriers modulated in accordance with said one of said channel types.

* * * * *

UNITED STATES PATENT AND TRADEMARK OFFICE
CERTIFICATE OF CORRECTION

PATENT NO.        : 8,824,574 B2              Page 1 of 1
APPLICATION NO.   : 12/557915
DATED             : September 2, 2014
INVENTOR(S)       : Ronald Duane McCallister et al.

It is certified that error appears in the above-identified patent and that said Letters Patent is hereby corrected as shown below:

On the title page following item (45) "Date of Patent:" please replace "Sep. 2, 2014" with
--*Sep. 2, 2014--.

Signed and Sealed this
Second Day of December, 2014

Michelle K. Lee
*Deputy Director of the United States Patent and Trademark Office*